US010441912B2

(12) United States Patent
Yoon

(10) Patent No.: US 10,441,912 B2
(45) Date of Patent: Oct. 15, 2019

(54) AIR CLEANER

(71) Applicant: Winix Inc., Siheung-si (KR)

(72) Inventor: Chul Min Yoon, Siheung-Si (KR)

(73) Assignee: WINIX INC., Siheung-si (KR)

( * ) Notice: Subject to any disclaimer, the term of this patent is extended or adjusted under 35 U.S.C. 154(b) by 133 days.

(21) Appl. No.: 15/857,886

(22) Filed: Dec. 29, 2017

(65) Prior Publication Data

US 2018/0200658 A1    Jul. 19, 2018

(30) Foreign Application Priority Data

Jan. 13, 2017    (KR) .................. 10-2017-0006258

(51) Int. Cl.
| B01D 53/22 | (2006.01) |
| B01D 46/44 | (2006.01) |
| G06K 19/06 | (2006.01) |
| B01D 46/00 | (2006.01) |
| B01D 46/10 | (2006.01) |

(52) U.S. Cl.
CPC ......... *B01D 46/44* (2013.01); *B01D 46/0005* (2013.01); *B01D 46/009* (2013.01); *B01D 46/10* (2013.01); *G06K 19/06028* (2013.01)

(58) Field of Classification Search
CPC ...... B01D 46/10; B01D 46/009; B01D 46/44; B01D 46/0005; G06K 19/06028
See application file for complete search history.

(56) References Cited

U.S. PATENT DOCUMENTS

| 6,013,121 A * | 1/2000 | Chiu ................. B01D 46/0086 55/417 |
| 6,077,336 A * | 6/2000 | Ulrich ....................... A61L 9/12 96/222 |
| 6,096,224 A * | 8/2000 | Champie .............. B01D 35/143 116/268 |
| 6,110,260 A * | 8/2000 | Kubokawa ......... B01D 46/0086 96/26 |
| 6,412,435 B1 * | 7/2002 | Timmons, Jr. ..... B01D 46/0086 116/70 |
| 6,432,168 B2 * | 8/2002 | Schonauer ............. F01N 9/002 55/282.3 |
| 6,537,347 B2 * | 3/2003 | Motouji ............. B01D 53/0454 422/82.02 |
| 6,894,620 B2 * | 5/2005 | Reinhardt .......... B01D 46/0086 340/606 |

(Continued)

FOREIGN PATENT DOCUMENTS

| KR | 20080112447 A | 6/2007 |
| KR | 20090113697 A | 4/2008 |
| KR | 20100030142 A | 3/2010 |

*Primary Examiner* — Anthony R Shumate
(74) *Attorney, Agent, or Firm* — Warn Partners P.C.

(57) ABSTRACT

Disclosed is an air cleaner a body, a cover detachably provided on a front side of the body and configured to have an intake hole to take air into the body, a filter case disposed between the body and the cover such that a filter is attached to the filter case, and an authorized filter sensor attached to the filter and the filter case to sense whether the filter is authorized, wherein the authorized filter sensor includes a transmitting member attached to a lower end portion of the filter or included in the lower end portion of the filter and a detecting member provided on the filter case to sense the transmitting member and detect a variable electrical property.

9 Claims, 4 Drawing Sheets

(56) References Cited

U.S. PATENT DOCUMENTS

| | | | | |
|---|---|---|---|---|
| 7,001,451 | B2* | 2/2006 | Kim | B01D 46/0086 |
| | | | | 356/438 |
| 7,621,978 | B2* | 11/2009 | Johansson | B01D 46/10 |
| | | | | 116/112 |
| 8,029,608 | B1* | 10/2011 | Breslin | B01D 46/0086 |
| | | | | 96/421 |
| 8,221,530 | B2* | 7/2012 | Peter | A61M 16/0808 |
| | | | | 95/43 |
| 9,120,043 | B2* | 9/2015 | Johansson | B01D 46/444 |
| 10,232,685 | B2* | 3/2019 | Anderson | B60H 3/0633 |
| 2003/0168389 | A1* | 9/2003 | Astle | B01D 27/101 |
| | | | | 210/85 |
| 2006/0032379 | A1* | 2/2006 | Kates | F24F 3/1603 |
| | | | | 96/417 |

* cited by examiner

AIR CLEANER

CROSS-REFERENCE TO RELATED APPLICATION(S)

This application claims the priority benefit of Korean Patent Application No. 10-2017-0006258 filed on Jan. 13, 2017, in the Korean Intellectual Property Office, the disclosure of which is incorporated herein by reference for all purposes.

BACKGROUND

1. Field

One or more example embodiments relate to an air cleaner, and more particularly, to an air cleaner that senses whether a filter is an authorized filter and predicts a replacement time of the filter.

2. Description of Related Art

In general, an air cleaner refers to a device that may clean the air by removing any type of dusts and bacteria included in the indoor air and by deodorizing the smell of tobacco, the smell of sweat, etc.

An air cleaner may have a limited life of a filter depending on a usage environment. When the life of the filter ends, a user may use a new filter purchased at an authorized retailer.

Because a filter is generally expensive, a similar filter is being sold online or offline at a lower price.

In comparison to an authorized filter, the similar filter has a low performance and an inferior quality and thus, may not appropriately support a performance of the air cleaner, which may lead to damages of users directly or indirectly.

Accordingly, there is a desire for a device for sensing an authorized filter such that an air cleaner is not to operate when an unauthorized filter is attached to the air cleaner.

For example, Korean Patent Application No. 10-2007-0060871 filed on Jun. 21, 2007 discloses "The filter locking device for the air cleaner".

SUMMARY

An aspect provides an air cleaner for contactlessly sensing whether a filter is an authorized filter when the filter is attached to a filter case.

Another aspect also provides an air cleaner controlled based on whether a filter is authorized to appropriately perform an operation and prevent a use of a similar filter.

Still another aspect also provides an air cleaner for detecting a status of a filter to predict a replacement time of the filter and change the filter at an appropriate time.

According to an aspect, there is provided an air cleaner including a body, a cover detachably provided on a front side of the body and configured to have an intake hole to take air into the body, a filter case disposed between the body and the cover such that a filter is attached to the filter case, and an authorized filter sensor attached to the filter and the filter case to sense whether the filter is authorized, wherein the authorized filter sensor includes a transmitting member attached to a lower end portion of the filter or included in the lower end portion of the filter and a detecting member provided on the filter case to sense the transmitting member and detect a variable electrical property.

The transmitting member may include a metal sheet or a metal pad, and the detecting member may include a capacitive sensor.

The detecting member may be disposed on a rear side of the filter case to face the transmitting member.

When the filter is attached to the filter case, the detecting member may be configured to detect a change in capacitance and an output voltage of the detection member may be changed based on the change in capacitance.

The air cleaner may further include an air deodorizer disposed in the body to deodorize the air taken via the intake hole and a controller configured to control an operation of the air deodorizer by determining whether the filter is authorized based on an electrical property detected by the detecting member.

The electrical property may include a capacitance or an output voltage, and a capacitance or an output voltage corresponding to the authorized filter may be stored in the controller such that whether the filter is authorized is determined by comparing the stored capacitance or output voltage to a capacitance or an output voltage detected by the detecting member.

According to another aspect, there is also provided an air cleaner including a body, a cover having an intake hole to take air into the body, a filter case disposed between the body and the cover such that a filter is attached to the filter case, a fixing member attached to or included in the filter, a deformable member attached to a top of the fixing member of the filter to be deformed by the air, and a detecting member provided in the filter case to sense the fixing member or the deformable member, wherein the detecting member is configured to determine a status of the filter or whether the filter is authorized.

The deformable member may be formed of a flexible material, and the detecting member may be configured to detect a degree of deformation of the deformable member with respect to the fixing member.

The fixing member may include a conductive sheet or a barcode, and the detecting member may be configured to detect a capacitance changed by the conductive sheet or recognize the barcode.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
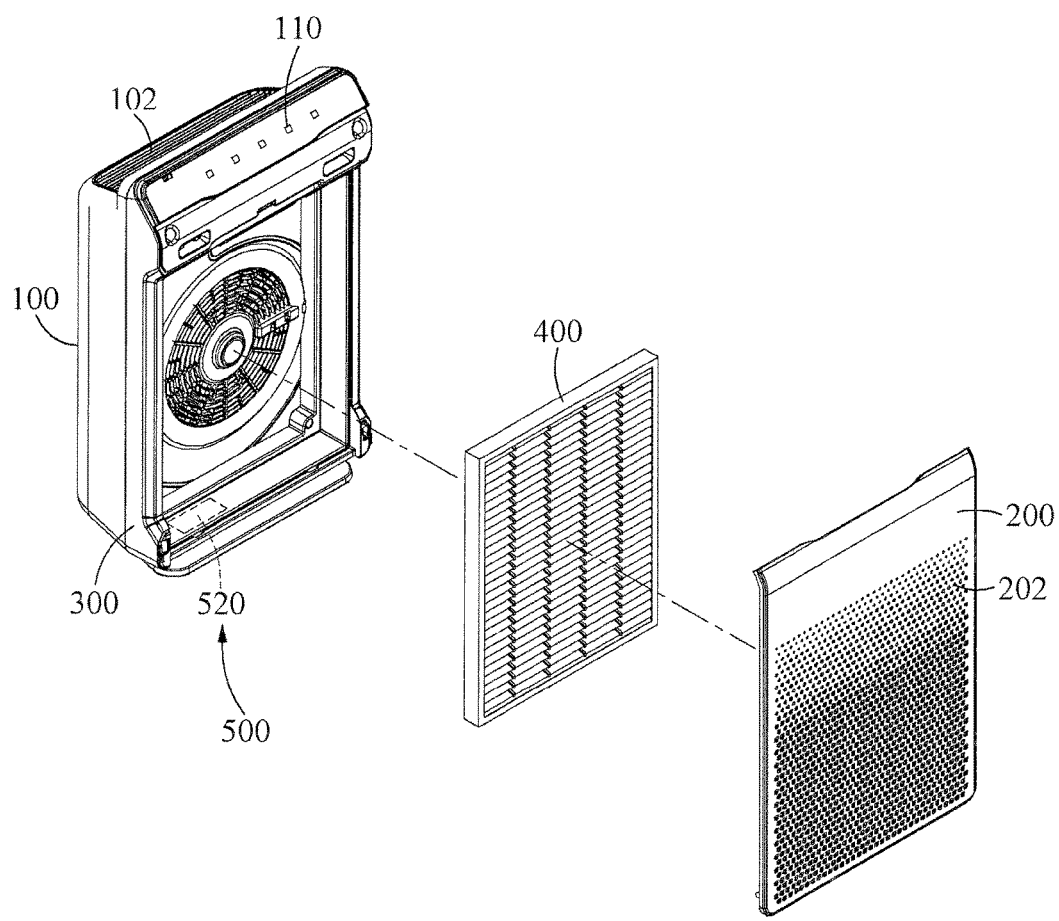
FIG. 1 illustrates an example of an air cleaner.

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Throughout the specification, when an element, such as a layer, region, or substrate, is described as being "on," "connected to," or "coupled to" another element, it may be directly "on," "connected to," or "coupled to" the other element, or there may be one or more other elements intervening therebetween.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 2:
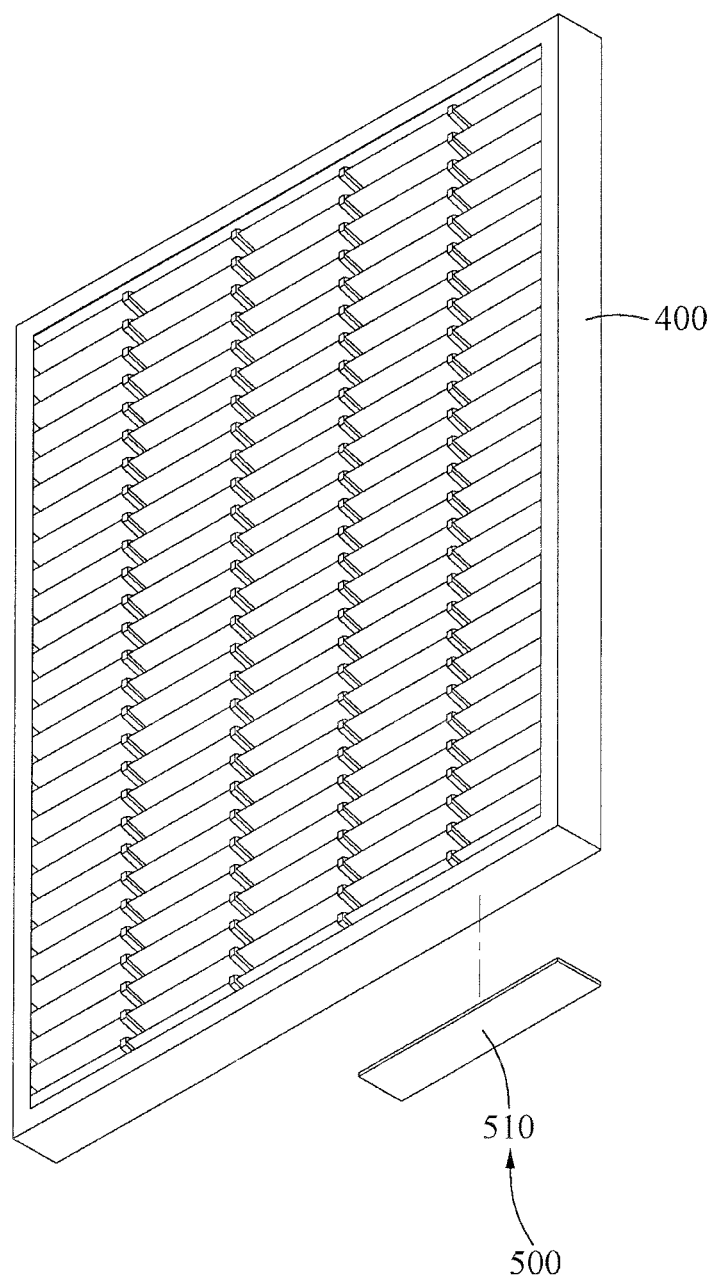
FIG. 2 illustrates an example of a transmitting member attached to a filter.
Figure 3:
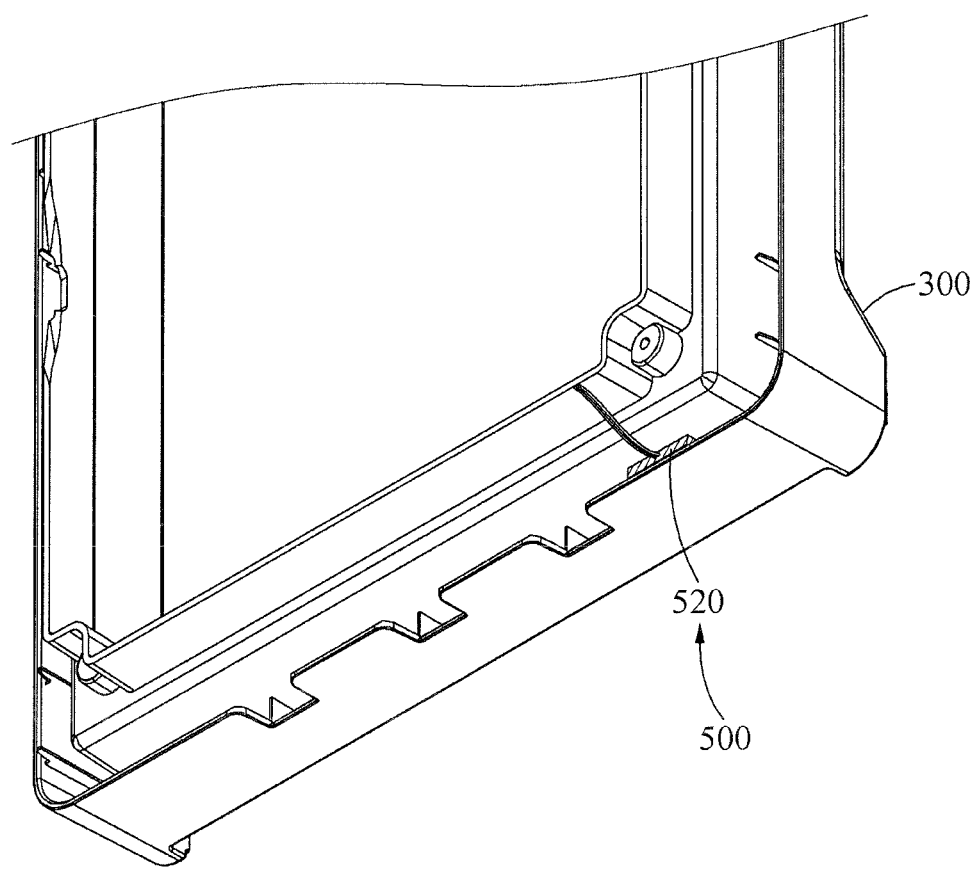
FIG. 3 illustrates an example of a detecting member attached to a filter case.
Figure 4:
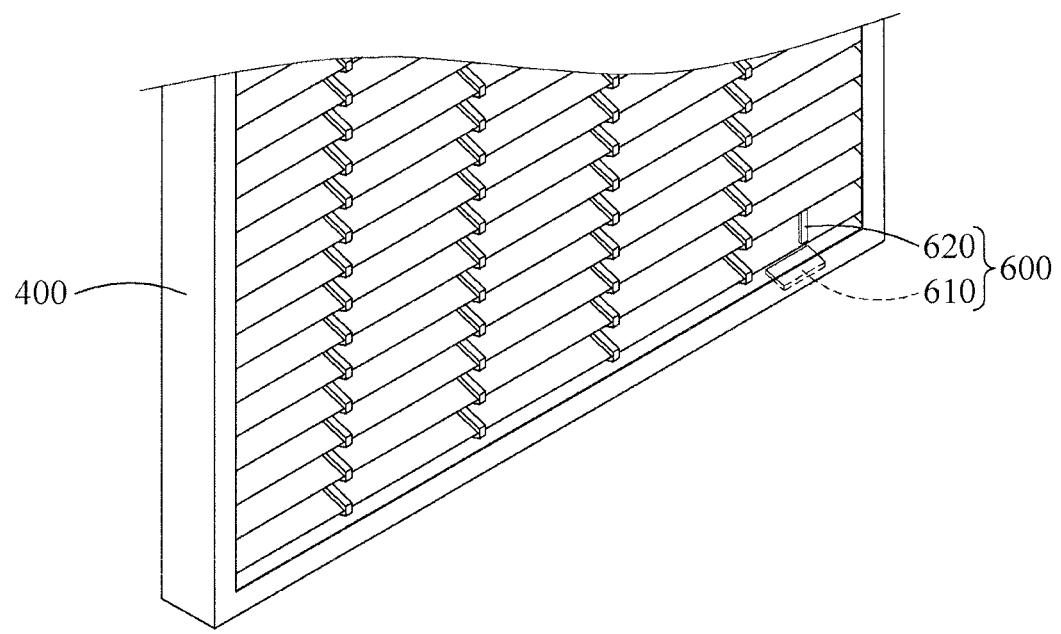
FIG. 4 illustrates an example of a deformable member and a fixing member attached to a filter.

FIG. 1 illustrates an example of an air cleaner, FIG. 2 illustrates an example of a transmitting member attached to a filter, FIG. 3 illustrates an example of a detecting member attached to a filter case, and FIG. 4 illustrates an example of a deformable member and a fixing member attached to a filter.

Referring to FIG. 1, an air cleaner 10 may include a body 100, an air deodorizer (not shown), a cover 200, a filter case 300, an authorized filter sensor 500, and a filter status sensor 600.

The body 100 may form an appearance of the air cleaner 10.

For example, when the air cleaner 10 is provided as a dehumidifying air cleaner, the air deodorizer including a heat exchanger (not shown), an air blower (now shown), and a water tank (not shown) may be provided in the body 100.

A shape or a size of the body 100 may vary based on a shape or a size of the heat exchanger, the air blower, and the water tank.

For example, the heat exchanger may include an evaporator and a condenser.

The evaporator may decrease a temperature of the air that passes through the evaporator by evaporating a liquefied refrigerant and by taking the heat from the air around the evaporator. Accordingly, a temperature of the air taken in the body 100 may decrease and condensation or dehumidification water may occur around the evaporator.

The condenser may condense the refrigerant used in the body 100, and may heat the air having passed through the condenser. Here, the condenser may be disposed in a lower class compared to the evaporator in an air blowing path.

Through the heat exchanger in the above structure, the air taken in the body 100 may be cooled while passing through the evaporator whereby moisture or humidity may be removed from the air. Also, the air may be heated while passing through the condenser and may move toward an outlet 102.

In detail, since the outlet 102 is provided on a top surface of the body 100, the air taken in the body 100 through intake holes 202 provided to the cover 200 may move toward the outlet 102 positioned on the top surface of the body 100.

The air blower may include a fan (not shown) and a motor (not shown) disposed to be adjacent to the heat exchanger, and may guide the air dehumidified at the heat exchanger within the body 100 to the outlet 102 provided to the body 100.

Also, the water tank may be disposed in a lower portion of the body 100.

For example, the water tank may be provided to fluidly communicate with the evaporator, and may be configured to collect the dehumidification water produced at the heat exchanger, particularly, the evaporator.

The body 100 may include a manipulator 110 configured to control an operation of the heat exchanger, the air blower, or the water tank. Using the manipulator 110, a user may conveniently select whether to operate the heat exchanger, the air blower, or the water tank, and may conveniently control the selected operation.

For example, the user may manually select and operate a desired humidity level or air volume. Also, the air cleaner 10 may detect indoor humidity and automatically operate the detected indoor humidity to reach a desired humidity level.

Although the air cleaner 10 is described as a dehumidifying air cleaner as an example, a configuration of the body 100 is not limited to the example. Any configuration capable of taking air into the air cleaner 10 is applicable here.

The cover 200 may be detachably provided to the body 100.

The cover 200 may be attached to a front side of the body 100, and may have a shape corresponding to the front side of the body 100.

The intake hole 202 configured to take the air into the body 100 may be formed on the cover 200. Accordingly, in a state in which the cover 200 is mounted to the body 100, the air may be taken in the body 100 through the intake holes 202 of the cover 200.

Meanwhile, once the cover 200 is detached from the body 100, the accessibility to the inside of the body 100 may be enhanced. Thus, it is possible to easily maintain and repair parts of the air cleaner 10 disposed in the body 100.

The filter case 300 may be between the body 100 and the cover 200. A filter 400 may be attached to the filter case 300.

For example, the filter case 300 may be attached to the front side of the body 100. The filter 400 may be attached to or detached from the filter case 300 after the cover 200 is detached from the body 100.

In this example, the authorized filter sensor 500 may be attached to the filter case 300 and the filter 400 to sense whether the filter 400 is an authorized filter.

Referring to FIGS. 1 through 3, the authorized filter sensor 500 may include a transmitting member 510 and a detecting member 520.

The transmitting member 510 may be included in or attached to a lower end portion of the filter 400.

When the transmitting member 510 is included in the lower end portion of the filter 400, it is possible to prevent a replication of the transmitting member 510 in a similar filter and prevent an error that the similar filter is recognized as an authorized filter.

The transmitting member 510 may include, for example, a metal sheet or a metal pad. Also, the transmitting member 510 may be provided in the lower end portion of the filter 400 and may increase an adhesion to the detecting member 520 using a weight of the filter 400.

The detecting member 520 may be provided in the filter case 300 to sense the transmitting member 510 and detect a variable electrical property.

The electrical property may include, for example, a capacitance or an output voltage.

For example, the detecting member 520 may be provided as a capacitive sensor and attached to the filter case 300 to face the transmitting member 510.

The detecting member 520 may be attached to a rear side of the filter case 300 to contactlessly sense the detecting member 520.

As the foregoing, when the transmitting member 510 includes the metal sheet or the metal pad and the detecting member 520 is provided as the capacitive sensor, a change in capacitance may be detected from the detecting member 520 in response to the transmitting member 510 accessing the detecting member, and the output voltage may also be changed based on the change in capacitance.

Specifically, when the transmitting member 510 accesses the detecting member 520, a value of a capacitance detected from the detecting member 520 may decrease and the output value may also decrease.

When the transmitting member 510 is attached to or included in a lower end portion of an authorized filter, and when the authorized filter is attached to the filter case 300, the change in capacitance or the change in output voltage may be detected from the detecting member 520.

The transmitting member 510 may have a metal sheet in various sizes and materials. Thus, a size and a material of the metal sheet may be selected such that the transmitting member 510 has a predetermined capacitance value.

The air cleaner 10 may further include a controller (not shown) configured to control an operation of the air deodorizer by determining whether the filter 400 is authorized based on the electrical property detected from the detecting member 520.

In the controller, a capacitance or an output voltage obtained in a case in which the authorized filter is attached to the filter case 300 may be stored in advance. Also, when the capacitance or the output voltage is detected by the detecting member 520, whether the filter 400 is the authorized filter may be determined by comparing the detected capacitance or output voltage to the prestored capacitance or output voltage.

In this example, when the capacitance or output voltage stored in the controller is identical to the capacitance or output voltage detected by the detecting member 520, it is determined that the filter 400 attached to the filter case 300 is the authorized filter.

For example, when the stored capacitance is 101 through 200 and the stored output voltage is 3 through 4 volts (V), and when the detected capacitance or output voltage is identical thereto, it is determined that the filter 400 attached to the filter case 300 is the authorized filter.

When the capacitance or output voltage stored in the controller is different from the capacitance or output voltage detected by the detecting member 520, it is determined that the filter 400 attached to the filter case 300 is a similar filter or the filter 400 has an attachment error.

For example, when the stored capacitance is 101 through 200 and the stored output voltage is 3 through 4 V, and when the detected capacitance is greater than 300 or less than or equal to 100 and the detected output voltage is 3 V or 5 V, it is determined that the filter 400 attached to the filter case 300 is the similar filter.

When the controller determines that the filter 400 is the authorized filter, the air deodorizer may operate normally. In contrast, when the controller determines that the filter 400 is the similar filter, when the controller determines that the filter 400 is not attached, or when the controller determines the filter 400 has the attachment error, the air deodorizer may not operate.

As such, when the similar filter is attached to the filter case 300 or the filter 400 is incorrectly attached, the air deodorizer may not operate. In this example, a use of the similar filter may be prevented and a performance of the air cleaner 10 may be maintained.

Although the transmitting member 510 provided as the metal sheet or the metal pad and the detecting member 520 provided as the capacitive sensor are described as an example, the present disclosure is not limited to the example. Depending on an example, the transmitting member 510 may also be provided as a barcode and configured to be recognized through near-field (NFC) communication with the detecting member 520.

Referring to FIG. 5, the filter status sensor 600 may be attached to the filter case 300 and the filter 400 to determined a status of the filter 400.

The filter status sensor 600 may include a fixing member 610, a deformable member 620, and a detecting member (not shown).

The fixing member 610 may be included in or attached to the filter 400.

In the filter 400, the fixing member 610 may be disposed at an upper position or the same position when compared to the transmitting member 510 of FIG. 2. The fixing member 610 may be provided separately, or provided as the same element as the transmitting member 510.

The deformable member 620 may be attached to a top of the fixing member 610 in the filter 400.

The deformable member 620 may be formed of a flexible material to be deformed by air taken via the intake hole 202. In this example, any deformable member configured to be deformed by the air taken via the intake hole 202 or configured to use the filter 400 deformed by the air taken via the intake hole 202 may be used as the deformable member 620.

The detecting member may be disposed differently from or identically to the detecting member 520 of FIG. 3. In this example, any detecting member configured to detect a degree of deformation of the deformable member 620 with respect to the fixing member 610 may be used as the detecting member.

In general, the deformable member 620 or blades included in the filter 400 may be appropriately deformed by the air taken via the intake hole 202. When the filter 400 is dusty, a degree to which the deformable member 620 or the blades in the filter 400 is deformed by the air taken via the intake hole 202 may decrease.

By detecting a degree of deformation of the deformable member 620 or the blades in the filter 400, the detecting member may sense a status of the filter 400, for example, an amount of dust in the filter 400. Through this, it is possible to predict a replacement time of the filter 400 or whether the filter 400 is to be replaced.

Also, whether the filter 400 is authorized may be sensed using the detecting member and the fixing member 610 of the filter status sensor 600.

A detecting member configured to detect whether a filter is authorized and a detecting member configured to sense a status of the filter may be provided as different members or the same member.

For example, when the detecting member configured to detect whether a filter is authorized and the detecting member configured to sense a status of the filter is provided as the same member, a plurality of functions may be implemented using a single detecting member and thus, a configuration of the air cleaner 10 may be simplified.

According to an aspect, it is possible to provide an air cleaner for contactlessly sensing whether a filter is an authorized filter when the filter is attached to a filter case.

According to another aspect, it is possible to provide an air cleaner controlled based on whether a filter is authorized to appropriately perform an operation and prevent a use of a similar filter.

According to still another aspect, it is possible to provide an air cleaner for detecting a status of a filter to predict a replacement time of the filter and change the filter at an appropriate time.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An air cleaner comprising:
   a body;
   a cover detachably provided on a front side of the body and configured to have an intake hole to take air into the body;
   a filter case disposed between the body and the cover such that a filter is attached to the filter case; and
   an authorized filter sensor attached to the filter and the filter case to sense whether the filter is authorized,
   wherein the authorized filter sensor comprises:
   a transmitting member attached to a lower end portion of the filter or included in the lower end portion of the filter; and
   a detecting member provided on the filter case to sense the transmitting member and detect a variable electrical property.

2. The air cleaner of claim 1, wherein the transmitting member includes a metal sheet or a metal pad, and the detecting member includes a capacitive sensor.

3. The air cleaner of claim 2, wherein the detecting member is disposed on a rear side of the filter case to face the transmitting member.

4. The air cleaner of claim 2, wherein when the filter is attached to the filter case, the detecting member is configured to detect a change in capacitance and an output voltage of the detection member is changed based on the change in capacitance.

5. The air cleaner of claim 1, further comprising:
   an air deodorizer disposed in the body to deodorize the air taken via the intake hole; and
   a controller configured to control an operation of the air deodorizer by determining whether the filter is authorized based on an electrical property detected by the detecting member.

6. The air cleaner of claim 5, wherein the electrical property includes a capacitance or an output voltage, and
   a capacitance or an output voltage corresponding to the authorized filter is stored in the controller such that whether the filter is authorized is determined by comparing the stored capacitance or output voltage to a capacitance or an output voltage detected by the detecting member.

7. An air cleaner comprising:
   a body;
   a cover having an intake hole to take air into the body;
   a filter case disposed between the body and the cover such that a filter is attached to the filter case;
   a fixing member attached to or included in the filter;
   a deformable member attached to a top of the fixing member of the filter to be deformed by the air; and
   a detecting member provided in the filter case to sense the fixing member or the deformable member,
   wherein the detecting member is configured to determine a status of the filter or whether the filter is authorized.

8. The air cleaner of claim 7, wherein the deformable member is formed of a flexible material, and
   the detecting member is configured to detect a degree of deformation of the deformable member with respect to the fixing member.

9. The air cleaner of claim 7, wherein the fixing member includes a conductive sheet or a barcode, and
   the detecting member is configured to detect a capacitance changed by the conductive sheet or recognize the barcode.

* * * * *